United States Patent
Arimatsu et al.

[11] Patent Number: 5,727,132
[45] Date of Patent: Mar. 10, 1998

[54] ROBOT CONTROLLING METHOD FOR TRACKING A MOVING OBJECT USING A VISUAL SENSOR

[75] Inventors: Taro Arimatsu; Takashi Jyumonji; Kazuhisa Otsuka; Hiroaki Kubota, all of Oshino-mura, Japan

[73] Assignee: Fanuc Ltd., Yamanashi, Japan

[21] Appl. No.: 518,713

[22] Filed: Aug. 24, 1995

[30] Foreign Application Priority Data

Aug. 25, 1994 [JP] Japan ................................ 6-222693

[51] Int. Cl.⁶ ........................................ G06F 15/46
[52] U.S. Cl. ........................... 395/94; 901/4; 901/47
[58] Field of Search ........................ 395/94; 901/7, 901/47, 4

[56] References Cited

U.S. PATENT DOCUMENTS

| | | | |
|---|---|---|---|
| 5,243,690 | 9/1993 | Chmielewski et al. | 395/97 |
| 5,297,238 | 3/1994 | Wang et al. | 395/94 |
| 5,305,427 | 4/1994 | Nagata | 395/94 |
| 5,475,797 | 12/1995 | Glaspy, Jr. et al. | 395/82 |

*Primary Examiner*—George B. Davis
*Attorney, Agent, or Firm*—Staas & Halsey

[57] ABSTRACT

A robot visual-tracking method in which the precision of a tracking movement of a robot is improved using a visual sensor. A count value N (0) of a pulse coder is stored when a sensor detects a workpiece. Then, arrival of the workpiece at a taught photographing position is detected based on an incremental quantity from the count value N (0) of the pulse coder, and the workpiece is photographed by a camera. A deviation is obtained between positions of two points Wa and Wb on the workpiece and the reference positions thereof. When the workpiece arrives at a tracking start position L1, a tracking coordinate system Σtr starts to move and tracking operations of the robot are started. In the tracking operation, the robot position is corrected to compensate the detected deviation amount. The robot approaches the workpiece W to meet with it and grips the workpiece W by a hand when the workpiece W reaches a position Q0. Then, when the workpiece W arrives at a tracking termination position L3, the tracking operation is terminated. The robot moves to a teaching point Q2 according to a normal playback operation, where the hand is opened to release the workpiece W.

2 Claims, 4 Drawing Sheets

ROBOT CONTROLLING METHOD FOR TRACKING A MOVING OBJECT USING A VISUAL SENSOR

BACKGROUND OF THE INVENTION

1. Field of the Invention

The present invention relates to a robot control method for performing an operation on an object (e.g., a subassembly) which is carried by conveyor such as a belt conveyor.

2. Description of the Related Art

In performing operations on an object using a robot, if the object stands still, the robot can trace a predetermined track in a playback operation by teaching the robot in advance according to the ordinary teaching/playback method or off-line teaching method. In order to cope with deviation in position and posture of the object, there is a method in which the position and posture of the object is measured by a visual sensor and the taught track of the robot is corrected based on the result of the measuring.

In a production line in a factory, it is typical to use a conveyor to successively carry the workpiece which is an object of operation. In performing an operation on such a moving workpiece by the robot, the following two methods are employed. The first method is to intermittently drive the conveyor. When the workpiece is conveyed to an operating position, the conveyor is temporarily stopped and the workpiece is positioned by a jig dedicated for that workpiece. The robot performs the predetermined operation on the thus positioned workpiece (stationary workpiece). This method requires different jigs to be suitable for different kinds of workpieces. A general-purpose jig may be used, but such jig has a complex structure. Further, this method is apparently unadvantageous in view of operation efficiency because there is a loss of time in stopping the conveyor in the production line for positioning the individual workpiece. If the traveling speed of the conveyor is increased to improve the operation efficiency, it would cause problems, such as slippage of workpiece, need of a large drive source and increase of the production cost.

The second method is to make the robot perform a tracking operation. By driving the robot to track the moving workpiece without stopping the conveyor, a predetermined operation can be performed on the workpiece by the robot. According to this tracking method, since no jigs are necessary and the robot performs the operation without stopping the conveyor, a high operating efficiency can be maintained. This tracking method, however, has a problem in operating precision. Namely, the problem with the tracking method is that the operation precision would be lowered due to the fact that an error in position and posture of the workpiece in placing it on the conveyor could not be recognized by the robot controller. Another problem with the tracking method is a tracking error due to the relatively high speed of the conveyor. When a robot controller detects and stores a count value of a pulse coder attached to the conveyor to recognize the position of a workpiece, there is a time lag due to an input signal scan cycle of a central processing unit (CPU) of the robot controller. This time lag would become nonnegligibly large. Such an error is difficult to compensate and would be a cause of tracking errors in the traveling direction of the conveyor.

SUMMARY OF THE INVENTION

An object of the present invention is to provide a method of controlling a robot for performing a precise tracking operation by making the robot accurately recognize an error in position and/or posture of an object on the conveyor without lowering the operation efficiency. Another object of the invention is to solve a problem of depression of the operation precision in the traveling direction of an object due to the input signal scan cycle.

According to the present invention, there is provided a method of controlling a robot system which performs an operation on an object which is conveyed along a traveling path by a conveyor. This robot system includes a conveyance amount detecting means for detecting an amount of conveyance of the object by said conveyor and outputting a detection signal representing the conveyance amount, an object detecting means disposed in the vicinity of the conveying path for detecting the object being conveyed by said conveyor, a visual sensor means for visually detecting a position and posture of the object being conveyed by the conveyor and having a camera disposed in the vicinity of the conveying path downstream of said object detecting means, and a robot controller. The method of the present invention comprises the steps of: setting a base coordinate system fixedly to a robot; setting a tracking coordinate system to move in synchronism with the travel of the conveyor; placing a reference object on the conveyor and conveying the reference object by the conveyor; obtaining an image of the reference object by the camera at a position where the reference object is conveyed a first predetermined distance from a position where the reference object is detected by the object detecting means; analyzing the obtained image by the visual sensor means to detect the position and posture of the reference object; teaching the robot at least one point on the reference object at a position where the reference object is conveyed a second predetermined distance from the position where the reference object is detected by the object detection means; placing an object of operation having the same dimension as that of the reference object on the conveyor and starting to convey the object by the conveyor; obtaining an image of the object of operation by the camera at an instant when the visual sensor means recognizes that the object of operation has been conveyed by the first predetermined distance based on the output signal of the conveyance amount detecting means from an instant when the visual sensor means recognizes that the object of operation is detected by the object detecting means; analyzing the obtained image by the visual sensor means to detect a position and posture of the object of operation; comparing the position/posture of the reference object and the position/posture of the object of operation and obtaining a deviation therebetween; starting tracking movement of the robot at an instant when the robot controller recognizes that the object of operation has been conveyed by a third predetermined distance based on the output signal from the conveyance amount detecting means from the instant when the robot controller recognizes that the object of operation is detected by the object detecting means; obtaining a position of a target point in the tracking coordinate system based on the position of the taught point, the output signal of the object detecting means and the output signal of the conveyance amount detecting means; converting the position of the target point in the tracking coordinate system into a position of the target point in the base coordinate system; correcting the converted position of the target point based on the obtained deviation; and controlling the robot based on the corrected position of the target point.

The method further includes the step of terminating the tracking movement of the robot at an instant when the robot controller recognizes that the object of operation has been conveyed a fourth predetermined distance based on the output signal of the conveyance amount detecting means from the instant when the robot controller recognizes that the object of operation is detected by the object detecting means.

An important feature of the present invention resides in that the invention solves a problem of a time lag due to the input signal scan cycle of the CPU of the robot controller, which could not have been overcome, using a visual sensor. Namely, when a position deviation of the object is detected using a visual sensor, the result of the detection takes in the time lag due to the input signal scan cycle of CPU of the robot controller, provided that the visual sensor and the robot controller simultaneously recognize a position of the moving object. Accordingly, if an instant when the sensor disposed at a fixed point detects the arrival of the object is not precisely recognized by the robot controller, such position deviation that is caused by the time lag can be compensated using the result of detection by the visual sensor.

The target position in the tracking operation is determined in accordance with the tracking coordinate system. In particular, path data designated by an operation program is regarded as data in the tracking coordinate system moving in synchronism with the conveyor and the robot path calculated from the data is corrected based on the position deviation. At that time, the robot position is corrected with respect to position deviation components perpendicular to the traveling direction of the conveyor, and thus a high degree of tracking precision can be realized in both direction.

DETAILED DESCRIPTION OF THE EMBODIMENT

A preferred embodiment of the present invention will be described in comparison with an example in which a robot performs the tracking operation without a visual sensor.

Firstly, the comparative example in which a robot performs a tracking operation (line tracking here) using no visual sensor will be explained referring to FIG. 1.

Figure 1:
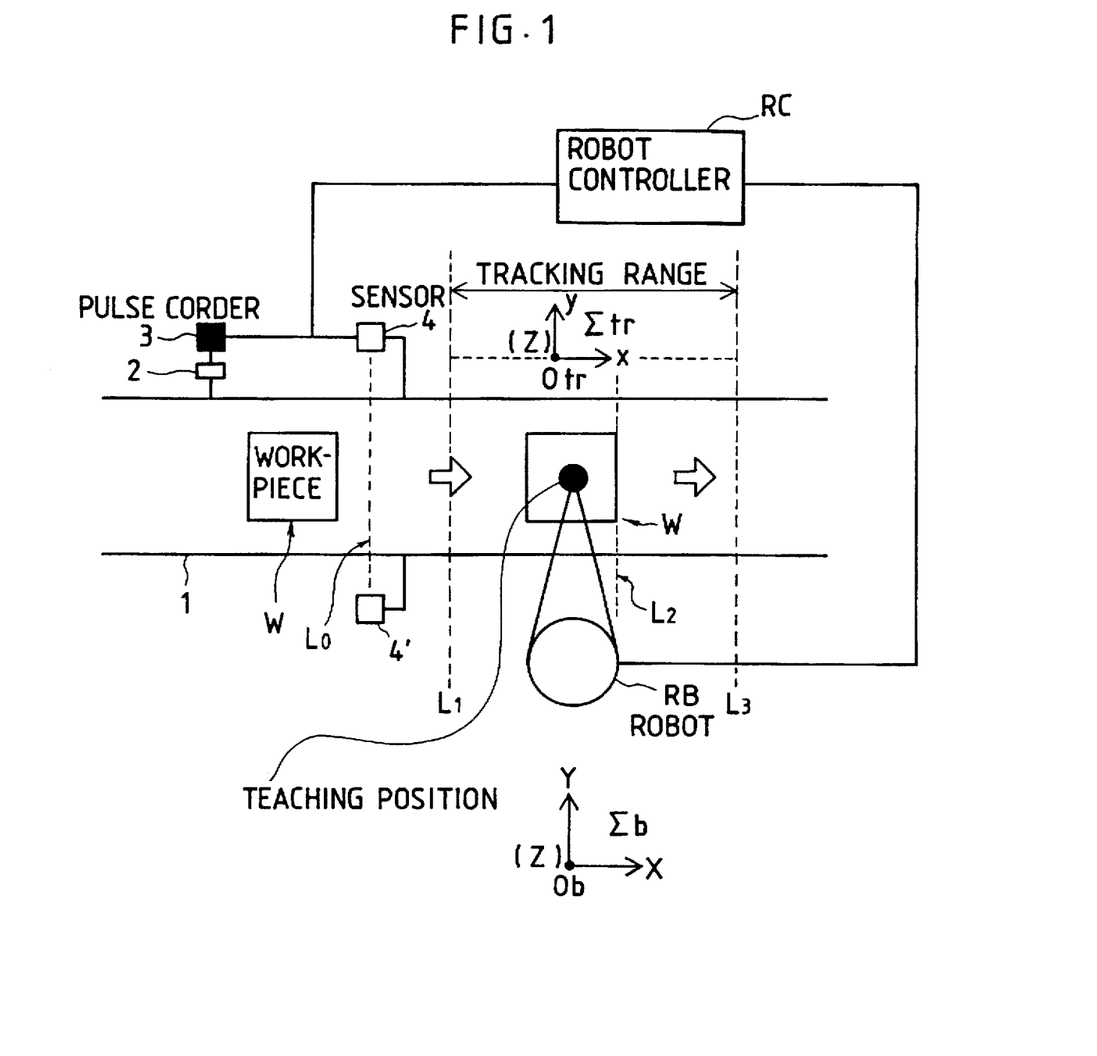
FIG. 1 (PRIOR ART), is a schematic diagram showing the principles of the tracking operation without a visual sensor in contrast with a method of the present invention.

As shown in FIG. 1, a belt conveyor 1, which is driven by a drive unit 2 with a motor, conveys a workpiece W placed thereon from a left side to a right side in this view. The distance of travel of the conveyor 1 (corresponding the quantity of rotation of the motor) is measured by a pulse coder 3 connected to the drive unit 2. Sensors 4 and 4' disposed at the side of or upwardly of the conveyor 1 detect that the workpiece W has reached a line L0. Various types of sensors, such as optical, mechanical and magnetic types can be adopted as the sensors 4 and 4'. A robot controller RC connected to a robot RB, the pulse coder 3 and the sensors 4 and 4' receives detection signals from the pulse coder 3, the sensors 4 and 4' and controls an operation of the robot RB.

The procedure of a tracking operation of the robot with the foregoing arrangement is as follows:

I. Setting Tracking Coordinate System

A base coordinate system $\Sigma b$ (0b-XYZ) fixed to the robot RB is set, and a tracking coordinate system $\Sigma tr$ (0tr-xyz) moving in synchronism with the travel of the conveyor 1 is set. The direction of travel of the conveyor 1 is identical with the direction of the X axis of the base coordinate system $\Sigma b$ (0b-XYZ). The posture of the tracking coordinate system $\Sigma tr$ (0tr-xyz) is identical with that of the base coordinate system $\Sigma b$ (0b-XYZ), i.e., the directions of axes x and y of the tracking coordinate system $\Sigma tr$ (0tr-xyz) is the same as the directions of X and Y axes of the base coordinate system $\Sigma b$ (0b-XYZ). Therefore, the tracking coordinate system $\Sigma tr$ moves with respect to the base coordinate system $\Sigma b$ in the direction of the x axis in synchronism with the travel of the conveyor 1.

II. Determining Scale Factor

The position of the tracking coordinate system $\Sigma tr$ is determined based on a count value of the pulse coder 3. A scale factor $\alpha = d/\Delta n$ representing a relationship between an increment $\Delta n$ of the count value of the pulse coder 3 and a travel distance d of the conveyor 1 is obtained in the following manner.

i) The object is set in an appropriate position P within a range of movement of the robot RB, and the count value n1 of the pulse coder at that time is stored in the robot controller RC.

ii) With the object placed stationary in the position P, the robot RB is manually moved until a tip of a tool mounted on the robot comes into touch with a predetermined point W0 on the object, and the position (X1, Y1, Z1) of a tool center point is stored in the robot controller RC.

iii) The conveyor 1 is driven until the object is moved to a different position P' within the range of movement of the robot RB, and a count value n2 of the pulse coder 3 at that time is stored in the robot controller RC.

iv) With the object placed stationary in the position P', the robot RB is manually operated until the tool tip comes into touch with the point W0 on the object while maintaining the posture of the tool, and a position (X2, Y2, Z2) of the tool center point is stored in the robot controller RC. As the base coordinate system $\Sigma b$ has the same posture as that of the tracking coordinate system $\Sigma tr$, it is comprehended that Y2=Y1 and Z2=Z1.

v) calculation $\alpha = (X2-X1)/(n2-n1)$ is performed to obtain the scale factor $\alpha$ by the robot controller RC, and the obtained scale factor $\alpha$ is stored in the robot controller RC.

III. At a position upstream of a sensing line L0 of the sensors 4 and 4', a reference workpiece having the same dimension as that of a workpiece on which an actual operation is performed is set on the conveyor 1, and the conveyor 1 is driven. A count value n(0) of the pulse coder 3 at a moment when the reference workpiece is detected by the sensors 4 and 4' (when the reference workpiece reached the line L0) is stored in the robot controller RC.

IV. The conveyor 1 is further driven until the reference workpiece is located at a position L1 suitable for the robot RB to start a tracking operation. A count value n(1) of the pulse coder 3 or an increment $\Delta n(10)=n(1)-n(0)$ at that time is stored in the robot controller RC.

V. The conveyor 1 is further driven until the reference workpiece is located at a position L2 suitable for the robot RB to perform a predetermined operation (e.g., gripping the workpiece by a robot hand). A count value n(2) of the pulse coder 3 or an increment $\Delta n(20)=n(2)-n(0)$ at that time is stored in the robot controller RC.

VI. With the reference workpiece placed stationary at the position L2, a necessary motion for performing a predetermined operation is taught to the robot RB.

VII. The conveyor 1 is further driven until the reference workpiece is located at a position L3 suitable for the robot RB to terminate the tracking operation. A count value n(3) or an increment Δn(30)=n(3)−n(0) at that time is stored in the robot controller RC.

Thus, the preparatory procedure for tracking has been completed and the tracking operation is ready to start. The progress of operations of the robot system is generally as follows:

1) A workpiece W on which an actual operation is to be performed by the robot RB is supplied onto the conveyor 1.
2) When the workpiece W passes the line L0, the sensors 4 and 4' detect the arrival of the workpiece W and output a detection signal to the robot controller RC.
3) A count value n(0') at that time is stored in the robot controller RC.
4) The conveyor 1 further travels and when the pulse coder count value reaches n(0')+Δn(10)=n(0')+n(1)−n(0), the tracking coordinate system Σtr is started to move. The travel distance is determined by multiplying the increment Δn of the count value of the pulse coder 3 by the scale factor α. The playback operation of the robot RB is performed in conformity with the tracking coordinate system, the robot RB catches up with the workpiece W to perform a predetermined operation in tracking.
5) The conveyor 1 further travels and when the pulse coder count value reaches n(0')+Δn(30)=n(0')+n(3)−n(0), the movement of the tracking coordinate system Σtr is terminated.
6) The robot RB performs the remaining operations (e.g., moving the gripped workpiece W). Thus, one operation cycle of the line tracking has been completed.

The foregoing tracking method has a problem in operating precision. Namely, the problem with the tracking method is that the operating precision would be lowered due to the fact that an error in position and posture of the workpiece in placing the workpiece on the conveyor could not be recognized. For example, in a gripping operation of a workpiece by the robot hand, if the position and/or posture of the workpiece W is deviated from the position and/or posture at the time of teaching, there is a possibility that the robot interferes with the workpiece W or fails in gripping the workpiece W.

Another problem with the tracking method is a tracking error due to the relatively high speed of the conveyor. In detecting and storing a count value of the pulse coder 3 when the workpiece W reaches the line L0, there is a time lag for a robot controller to recognize the position of a workpiece due to the input signal scan cycle of a CPU of the robot controller. This time lag may reach tens [msec], though depending on the robot system. For example, assuming that the time lag is 28 [msec] at maximum and the conveyor speed is 600 [mm/sec], the error would become 600×0.028= 16.8 [mm], which is nonnegligibly large. This error is difficult to compensate and would be a cause of tracking errors in the traveling direction of the conveyor (the directions of X axis and x axis).

Figure 2:
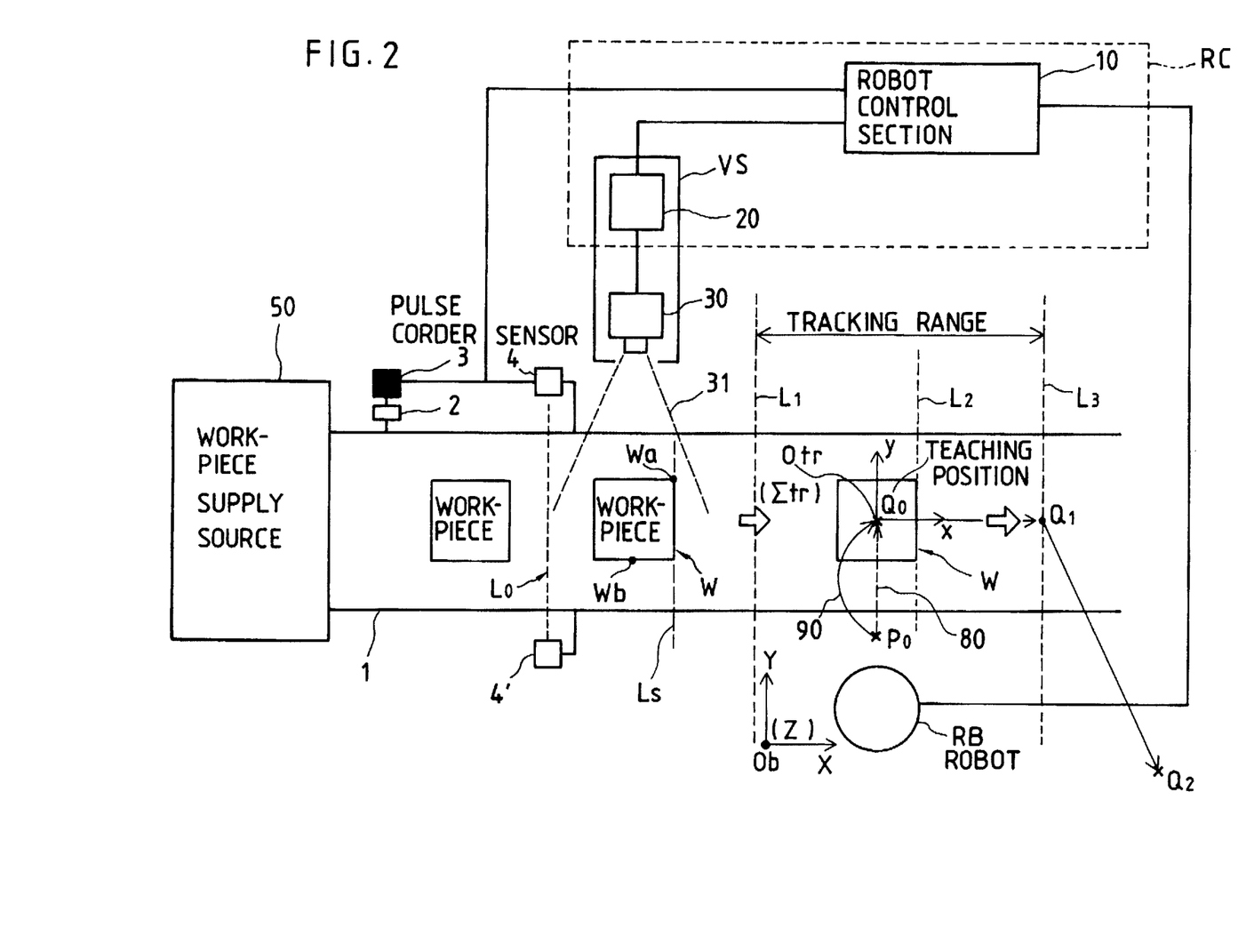
FIG. 2 shows a robot system for carrying out the method of the present invention.

FIG. 2 shows an example of a robot system for carrying out the method of the present invention.

In FIG. 2, a linear-traveling conveyor 1 is connected to a workpiece supply source 50 (e.g., a final pressing station). A drive shaft of the conveyor 1 is driven by a motor within a drive unit. The quantity of rotation of the drive shaft or the motor is counted and outputted in terms of pulse train by a pulse coder 3. Sensors 4 and 4' detect an edge of a workpiece carried on the conveyor 1 at a detection line L0.

A visual sensor VS comprises an image processor 20 and a camera 30 (e.g., a CCD camera) having a field of view 31. The image processor 20 is included in a robot controller RC which is indicated by dotted lines in FIG. 2.

The robot controller RC has a robot control section 10 which receives a detection signal representing the position and posture of the workpiece W from the image processor 20 and uses the received signal for controlling the robot RB. The robot controller RC is connected to the sensors 4 and 4' and recognizes the position of the workpiece W using the detection signal of the sensors 4 and 4'.

Figure 3:
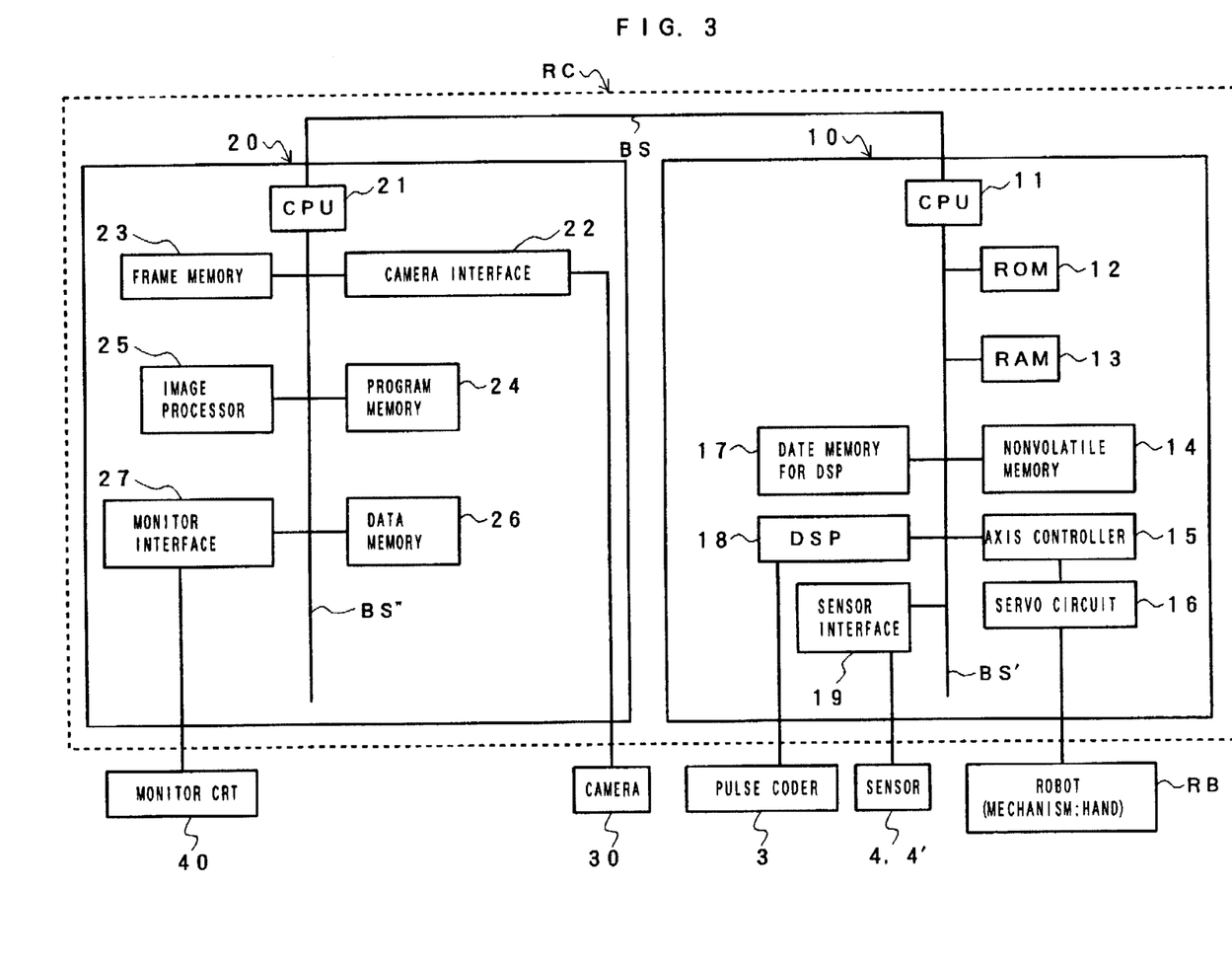
FIG. 3 is a block diagram showing a main part of a robot controller in the robot system of FIG. 2.

The robot controller RC in an arrangement of FIG. 2 will be described in detail referring to FIG. 3.

Firstly, the structure and function of the image processing device 20 within the robot controller RC will be explained. In FIG. 3, the image processing device 20 has a central processing unit (CPU) 21 in the form of a microprocessor. A camera interface 22, a frame memory (image memory) 23, a program memory 24, an image processor 25, a data memory 26 and a monitor interface 27 are connected to the CPU 21 via a bus BS".

The camera 30 is connected to the camera interface 22. When a photographing command is sent to the camera 30 via the camera interface 22, photographing is performed by an electronic shutter (whose shutter speed is, e.g., 1/1000 sec) of the camera 30, and image signals are stored in the frame memory 23 in terms of gray scale signals via the camera interface 22. A monitor CRT 40 is connected to the monitor interface 27 for displaying an image being taken by the camera 30, the past image stored in the frame memory 23, an image processed by the image processor 25, etc.

The image signals of the workpiece stored in the frame memory 23 are analyzed by the image processor 25 according to a analysis program stored in the program memory 24 to obtain a position of the workpiece. In the illustrated example, the workpiece has two characterizing points indicated by Wa and Wb in FIG. 2. The respective positions of Wa and Wb are calculated and the posture of the workpiece is calculated based on the calculated positions of Wa and Wb.

The data memory 26 includes an area for storing various set values related to the visual sensor system, and an area to be used in temporarily storing data necessary for various processings to be performed by the CPU 21.

Within the robot controller RC, the CPU 21 is connected to a CPU 11 of a robot control section 10, which is further described below, via a bus BS. The image processing device 20 is an equipment substantially integral with the robot control section 10. Thus, the image processing device 20 and the robot control section 10 constitutes the robot controller RC with a built-in visual sensor.

The robot control section 10 has a CPU 11 connected to the CPU 21 of the image processor 20 via a bus BS. To the CPU 11, a ROM 12 in which a program for controlling the entire system is stored, a RAM 13 to be used in temporarily storing data for the CPU processing, a nonvolatile memory 14 in which an operating program, coordinate set data and other various set parameters are stored, an axis control device 15 connected to a mechanical section of the robot RB including a hand via a servo circuit 16, a digital signal processor (DSP) 18, a data memory 17 for the DSP 18, and a sensor interface 19 for the sensors 4 and 4' are connected via a bus BS'.

The DSP 18 is a processor for processing the output signal of the pulse coder 3 connected to the DSP 18, and the data memory 17 dedicated for DSP stores various processing data and set parameters of DSP 18. The DSP 18 has a function of detecting a counted value of the output signals of the pulse coder 3 at an arbitrary point in time and storing the counted value in a predetermined area of the data memory 17, according to a command from the CPU 11. The CPU 21 of the image processing device 20 can access the data memory 17 via the CPU 11.

With the foregoing system arrangement and function as premises, the preparatory operations and processings for carrying out the method of the invention will be explained. In each of the program memory 24 and the data memory 26 of the image processing device 20 and each memory in the robot control section 10, programs and the related set data for carrying out necessary processings are stored in advance.

In operation of the robot RB, (1) the tracking movement is started at a time when the workpiece W has reached a line L0, which is a starting line of the tracking range, from a point P0 of an initial position, (2) the robot hand meets the workpiece W at a teaching position Q0, (3) the gripping of the workpiece by the robot hand is completed before the workpiece W reaches a line L3 (position Q1), which is an ending line of the tracking range, and (4) moves straightway from the position Q1 on the conveyor 1 to a position Q2 spaced sideways from the conveyor 1.

The preparatory operations include preparatory operations related to the visual sensor VS in addition to the preparatory operations to be made for the system of FIG. 1.

I) Setting A Tracking Coordinate System

Likewise, the robot system of FIG. 1, a base coordinate system $\Sigma b$ and a tracking coordinate system $\Sigma tr$ moving in synchronism with the conveyor 1 are set for the robot RB. The relation between these two coordinate values until the tracking coordinate system $\Sigma tr$ starts to move is expressed by the following equation (1):

$$\begin{cases} x = X - X0 \\ y = Y - Y0 \\ z = Z \end{cases} \quad (1)$$

X0 and Y0 are constants, and the data thereof is stored in the nonvolatile memory 14 of the robot control section 10 and the data memory 26 of the image processing device 20. As the tracking coordinate system $\Sigma tr$ starts to move when the edge of the workpiece reaches the line L1 in this embodiment, $X0=\alpha\{n(2)-n(1)\}$ is set. $Y0=0$ is set for the simplicity of processing.

II) Setting Sensor Coordinate System $\Sigma s$

A sensor coordinate system $\Sigma s$ is set to the visual sensor Vs. In this setting, a calibration jig is placed in a position whose coordinate value in the base coordinate system $\Sigma b$ is known, and a calibration program stored in the program memory 24 of the image processing device 20 is executed to obtain conversion data for converting pixel value data of the camera 30 into coordinate data in the sensor coordinate system $\Sigma s$. The obtained conversion data is stored in the data memory 26 of the image processing device 20. Further, data representing the relation between the sensor coordinate system $\Sigma s$ and the base coordinate system $\Sigma b$ is stored in the nonvolatile memory 14 of the robot control section 10.

III) Determining Scale Factor

In the same manner as that for the robot system without a visual sensor shown in FIG. 1, a scale factor $\alpha=d/\Delta n$ representing the relation between a travel distance d of the conveyor 1 and an increment $\Delta n$ of count value of the pulse coder 3 is obtained. The value of the obtained $\alpha$ is stored in the nonvolatile memory 14 of the robot controller RC and the data memory 26 of the image processing device 20.

IV) After setting the reference workpiece at the left side of the sensing line L0 of the sensors 4 and 4' on the conveyor 1, the conveyor 1 is driven, and a pulse coder count value n(0) at the instant when the reference workpiece has been detected by the sensors 4 and 4' (when the edge of the reference workpiece has reached the line L0) is stored in the data memory 17 of the robot control section 10 and the data memory 26 of the image processing device 20.

V) The conveyor 1 is further driven to move the reference workpiece at a suitable position within the field of view 31 of the camera 30. $\Delta n(s0)=n(s)-n(0)$ is calculated using the pulse coder count value n(s) at that time and the stored n(0), and is stored in the data memory 26. Photographing by the camera 30 is performed to obtain an image of the reference workpiece, and the obtained image is stored in the frame memory 23 as a reference image.

VI) The conveyor 1 is still further driven to locate the reference workpiece to a position L1 suitable for the robot RB to start tracking. $\Delta n(10)=n(1)-n(0)$ is calculated using the pulse coder count value n(1) at the position L1 and the stored n(0), and is stored in the data memory 17.

VII) The conveyor 1 is further driven to locate the reference workpiece to a position L2 suitable for the robot RB to perform a predetermined operation (e.g., gripping of the workpiece W by the robot hand). $\Delta n(20)=n(2)-n(0)$ is calculated using the pulse coder count value n(2) at the position L2 and the stored n(0), and is stored in the data memory 17.

VIII) The robot RB is taught a point Q0 at which the predetermined operation is to be performed and a motion necessary to perform the predetermined operation. In the illustrated example, gripping of the workpiece by opening/closing of the robot hand is taught.

IX) The conveyor 1 is further driven to locate the reference workpiece at a position L3 suitable for the robot RB to terminate tracking. $\Delta n(30)=n(3)-n(0)$ is calculated using the pulse coder count value n(3) at the position LB and the stored n(0), and is stored in the data memory 17.

X) A position Q2 at which the workpiece is to be released is taught to the robot, and also releasing of the workpiece by opening the robot hand is taught to the robot.

Thus, the preparatory operations for performing tracking have been completed. The processings of the CPU for making the robot perform the predetermined operation in tracking will be described referring to the flowchart of FIG. 4.

Figure 4:
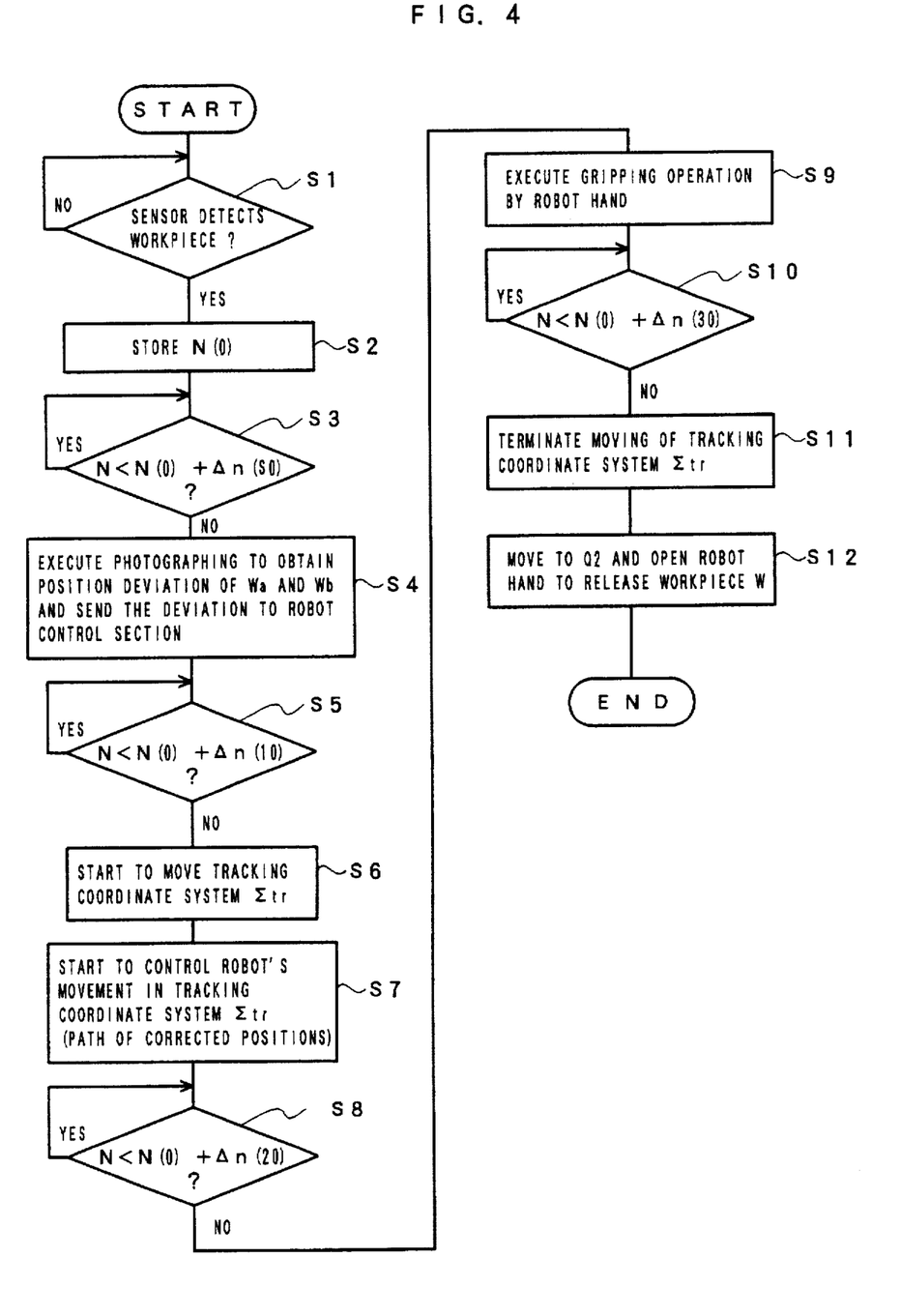
FIG. 4 is a flowchart schematically showing the robot control processings according to the present invention.

The processing is started in response to a signal informing that the workpiece W to be actually operated has been supplied on the conveyor 1. The CPUs 11 and 21 await a signal from the sensors 4 and 4' that the workpiece W reaches the sensing line L0 (Step S1). When the sensors 4 and 4' detect that the leading edge of the workpiece W has reached the line L0, a pulse coder count value N(0) at that time is stored in the data memory 17 and the data memory 26 (Step S2).

Then, the CPU 21 proceeds to a step of waiting for the workpiece W to reach a photographing position of the visual sensor taught in the preparatory operations (Step S3). It is determined that the workpiece W has reached the taught photographing position when the pulse coder count value N has reached $N(0)+\Delta n(s0)$. This $\Delta n(s0)$ is converted into a quantity representing a distance from the line L0 to the photographing position, using the scale factor $\alpha$.

When the workpiece W reaches the taught photographing position, photographing by the camera 30 is performed and the image data of the workpiece W is compared with the reference image data obtained in the preparatory operations. A deviation amount ε is obtained between the positions of the two points Wa and Wb on the workpiece W and the reference positions of the corresponding two points on the reference workpiece, and data representing the deviation amount ε is transmitted to the robot control section 10 (Step S4).

Then, the processing proceeds to a step of awaiting for the workpiece W to reach a tracking start position (line L1) taught in the preparatory operations (Step S5). It is determined that the workpiece W has reached the taught tracking start position when the pulse coder count value N has reached N(0)+Δn(10). This Δn(10) is converted into a quantity representing a distance from the line L0 to the starting position L1 of tracking, using the scale factor α.

When the workpiece W reaches the starting line L1 of tracking, the tracking coordinate system Σtr is started to move (Step S6). After starting the movement of the tracking coordinate system Σtr, the relation between a coordinate value (x, y, z) on the tracking coordinate system and a coordinate value (X, Y, Z) on the base coordinate system is expressed by the following equation (2) at an arbitrary point in time.

$$\begin{cases} x = X - X0 - \alpha[\{N - N(0)\} - \{n(1) - n(0)\}] \\ y = Y - Y0 \\ x = Z \end{cases} \quad (2)$$

In the above equation, α is a scale factor obtained in the preparatory operations, and X0 and Y0 are given constants representing the relationship between the origins of the tracking coordinate system and the base coordinate system before the tracking coordinate system starts to move. N represents a pulse coder count value that the CPU 11 of the robot control section 10 recognizes at the point in time.

Immediately after (or before) the tracking coordinate system has started to move, an operating program is read to make the robot RB perform tracking movement in conformity with the tracking coordinate system (Step S7). Namely, the position of a target point in the tracking coordinate system is calculated every interpolation cycle based on the position data of the teaching point taught in the above preparatory operation VIII), and the obtained position is converted according to the equation (2) to derive a target position in the base coordinate system.

Further, in calculating the target position to be repeated in a interpolation calculating cycle, the robot position (including the robot posture) is corrected based on the deviation amount ε obtained in step S4.

The robot RB (the tool center point) approaches the taught position Q0 (the position corrected based on the deviation amount obtained in step S4) along a curvilinear trajectory 90 as shown in FIG. 2. A linear trajectory 80 shows a moving path when the robot RB is controlled on the basis of the base coordinate system Σb. By setting the traveling speed of the conveyor 1 to a suitable value, the robot RB meet with the workpiece W immediately before the workpiece W reaches the position Q0.

When the robot controller RC recognizes that the workpiece W has reached the position Q0, the robot RB performs the gripping of the workpiece W by the robot hand (Steps S8–S9). During the operation, the robot RB (the tool center point) continues to move synchronously with the tracking coordinate system and the conveyor 1. The arrival of the workpiece W at the position Q0 is determined when the pulse coder count value N reaches N(0)+Δn(20).

Then, the processing proceeds to a step of periodically detecting that the workpiece W reaches the tracking termination position (line L3) taught in the preparatory operations (Step S10). It is determined that the workpiece W has reached the taught tracking termination position when the pulse coder count value N reaches N(0)+Δn(30). This Δn(30) is converted into a quantity representing a distance from the line L0 to the tracking termination position L3 using the scale factor α.

When the workpiece W reaches the tracking termination line L3, the moving of the tracking coordinate system Σtr is terminated (Step S11). At that time, the robot RB has finished to grip the workpiece W and is moved to the next taught point Q2 according to the normal playback operation, where the robot hand is opened to release the workpiece W (Step S12). Thus, one operating cycle according to the method of the invention has been completed.

The following observations are made on a tracking error in the traveling direction of the conveyor according to the method of the invention.

(1) At an instant when the workpiece W has reached the sensing line L0, a pulse coder count value N(0) is recognized simultaneously by the robot control section and the visual sensor. At this time, the conveyor 1 has travelled by a distance corresponding to δ pulses from the sensing line L0 due to the processing lag caused by the input signal scan cycle of the robot controller.

(2) The visual sensor detects the object W at an instant when the pulse coder count value N proceeds Δn(s0) from N(0) at the starting point. The conveyor 1 has also advanced by δ pulses at this detection time. Thus, the obtained image of the object W on the conveyor 1 is advanced by δ pulses.

(3) The visual sensor notifies the robot control section of the analysis result of the detected image. Thus, the robot control section is notified of the advance of δ pulses (deviation in the traveling direction of the conveyor resulted from the time lag due to the input signal scan cycle) and the position deviation of the workpiece resulted from other factors.

(4) As is understood from the foregoing, the deviation of the object in the traveling direction of conveyor due to the input signal scan cycle is handled as "the position deviation of the object (in terms of space rather than in terms of time)" by the visual sensor. As a result, a tracking error due to the input signal scan cycle is reduced.

In the foregoing embodiment, the termination of tracking is determined in the same manner as that of starting of tracking. Alternatively, the timing of termination of tracking may be determined in various manners. For example, on condition that the termination of tracking does not affect the operation, it may be determined by designating a period of tracking or a fixed position In the direction of X axis of the base coordinate system Σb.

It is matter of course that the robot operation should not be limited to the gripping of the workpiece. Further, tracking is not limited to the linear tracking in the above embodiment and the invention may be adapted to a circular tracking by appropriately defining the path of movement/rotation of the tracking coordinate system.

According to the present invention, a tracking error in the traveling direction of the object due to the input signal scan cycle of the robot system is compensated. Also, a tracking error resulting from deviation in posture and position of the object in the traveling direction and also in a direction perpendicular thereto can be simultaneously compensated by the function of the visual sensor. Accordingly, high-precision robot operations can be achieved without interrupting the movement of the object. The robot system can perform an operation on a workpiece of various shapes and sizes by altering the camera arrangement or by altering and/or adding an image analysis software or related parameters without preparing a dedicated jig or a multi-purpose jig.

What is claimed is:

1. A method of controlling a robot system for performing an operation on an object being conveyed along a conveying path by a conveyor, said robot system includes conveyance amount detecting means for detecting an amount of conveyance of the object by said conveyor and outputting a detection signal representing the conveyance amount, object detecting means disposed in a vicinity of the conveying path for detecting the object being conveyed by said conveyor, visual sensor means for visually detecting a position and posture of the object being conveyed by the conveyor and having a camera disposed in a vicinity of the conveying path downstream of said object detecting means, and a robot controller, said method comprising the steps of:

(a) setting a fixed base coordinate system to a robot;

(b) setting a tracking coordinate system to move in synchronism with the conveying path of said conveyor;

(c) placing a reference object on said conveyor and conveying the reference object by the conveyor;

(d) obtaining an image of said reference object by said camera at a position where the reference object is conveyed a first predetermined distance from a position where the reference object is detected by said object detecting means;

(e) analyzing said image obtained in said step (d) by said visual sensor means to detect a position and posture of the reference object;

(f) teaching the robot at least one point on the reference object at a position where the reference object is conveyed a second predetermined distance from the position where the reference object is detected by said object detection means;

(g) placing an object of operation having the same dimension as that of the reference object on said conveyor and conveying the object by said conveyor;

(h) obtaining an image of the object of operation by said camera at an instant when said visual sensor recognizes that the object of operation has been conveyed by said first predetermined distance based on the detection signal of said conveyance amount detecting means from an instant when said visual sensor recognizes that the object is detected by said object detecting means;

(i) analyzing said image obtained in said step (h) by the visual sensor means to detect a position and posture of said object;

(j) comparing the position/posture of said reference object detected in said step (e) and the position/posture of said object detected in said step (i) and obtaining a deviation therebetween;

(k) starting a tracking movement of the robot at an instant when said robot controller recognizes that the object has been conveyed by a third predetermined distance based on the detection signal from said conveyance amount detecting means from the instant when the robot controller recognizes that the object of operation is detected by said object detecting means;

(l) obtaining a position of a target point in the tracking coordinate system based on the position of the point taught in said step (f), an output signal of said object detecting means and the detection signal of said conveyance amount detecting means;

(m) converting the position of the target point in said tracking coordinate system into a position of the target point in said base coordinate system;

(n) correcting the position of the target point converted in said step (m) based on the deviation obtained in said step (j); and (o) controlling the robot based on the position of the target point corrected in said step (n).

2. A method of controlling a robot system according to claim 1, further including the step of terminating the tracking movement of the robot at an instant when the robot controller recognizes that the object of operation has been conveyed a fourth predetermined distance based on the detection signal of said conveyance amount detecting means from the instant when the robot controller recognizes that the object of operation is detected by said object detecting means.

* * * * *